United States Patent
Loke et al.

(10) Patent No.: US 8,995,596 B1
(45) Date of Patent: Mar. 31, 2015

(54) TECHNIQUES FOR CALIBRATING A CLOCK SIGNAL

(75) Inventors: Keen Yew Loke, Bayan Lepas (MY); Siew Leong Lam, Petaling Jaya (MY)

(73) Assignee: Altera Corporation, San Jose, CA (US)

( * ) Notice: Subject to any disclaimer, the term of this patent is extended or adjusted under 35 U.S.C. 154(b) by 207 days.

(21) Appl. No.: 13/369,188

(22) Filed: Feb. 8, 2012

(51) Int. Cl.
*H04L 27/06* (2006.01)
*H04L 12/815* (2013.01)

(52) U.S. Cl.
CPC .................................... *H04L 47/22* (2013.01)
USPC ........................................................ 375/362

(58) Field of Classification Search
USPC ........................... 375/344, 375, 376, 320, 353
See application file for complete search history.

(56) References Cited

U.S. PATENT DOCUMENTS

| | | | |
|---|---|---|---|
| 6,280,011 B1 | 8/2001 | Schloeman et al. | |
| 6,564,269 B1 | 5/2003 | Martin | |
| 6,685,289 B2 | 2/2004 | Anderson et al. | |
| 6,726,298 B2 | 4/2004 | Anderson et al. | |
| 6,735,731 B2* | 5/2004 | Ewen et al. | 714/733 |
| 6,956,923 B1* | 10/2005 | Younis et al. | 375/375 |
| 7,073,001 B1 | 7/2006 | Kucharewski et al. | |
| 7,499,677 B2 | 3/2009 | Yu et al. | |
| 8,305,903 B1* | 11/2012 | Louise et al. | 370/241 |
| 2002/0021470 A1* | 2/2002 | Savoj | 359/158 |
| 2002/0140461 A1 | 10/2002 | Enam et al. | |
| 2002/0140747 A1 | 10/2002 | Anderson et al. | |
| 2005/0094745 A1* | 5/2005 | Miyanaga et al. | 375/320 |
| 2006/0022119 A1 | 2/2006 | Tinkler et al. | |
| 2009/0202026 A1* | 8/2009 | Huang | 375/355 |
| 2010/0164934 A1 | 7/2010 | Kim | |
| 2010/0189126 A1* | 7/2010 | Lurie et al. | 370/445 |
| 2011/0063746 A1* | 3/2011 | Aravind | 360/31 |
| 2013/0083874 A1* | 4/2013 | de Ruijter et al. | 375/344 |
| 2013/0188965 A1* | 7/2013 | Afriat et al. | 398/136 |

* cited by examiner

*Primary Examiner* — Jaison Joseph

(57) ABSTRACT

Circuits and techniques for operating an integrated circuit are disclosed. A disclosed method includes receiving a data packet with a first operating frequency rate with first and second receiver circuits. The data packet may include a plurality of preamble bits. The first and second receiver circuits may operate at second and third operating frequency rates, respectively. A portion of the data packet received at the first receiver circuit is transmitted to a control circuit. The plurality of preamble bits within the portion of the data packet is identified with the control circuit. A clock circuit is then calibrated based on the plurality of preamble bits. The first and second receiver circuits may be clocked with first and second clock outputs from the clock circuit.

21 Claims, 6 Drawing Sheets

TECHNIQUES FOR CALIBRATING A CLOCK SIGNAL

BACKGROUND

Integrated circuits usually include circuitry and multiple logic blocks that may be configured to perform any of a variety of functions. Programmable integrated circuit devices such as field-programmable gate arrays (FPGAs), complex programmable logic devices (CPLDs), etc., may include logic blocks or elements that can be configured to perform desired functions based on different user designs.

Apart from internal logic blocks that may be used to implement or perform different user functions, a programmable logic device generally includes input-output blocks or high-speed transceiver channel blocks that may be used to communicate with other components coupled to the programmable logic device through various input-output protocols.

As an example, the programmable logic device and any external components coupled to it may be part of a passive optical network (PON) structure. In general, a PON structure is a point-to-multipoint network architecture that allows a single provider node, commonly known as an optical line terminal (OLT), to serve multiple user nodes, commonly known as optical network terminals (ONUs). As such, the programmable device may be configured to implement a high speed communication protocol such as a Gigabit Passive Optical Network (GPON) protocol to communicate with any of the external components coupled to it.

However, several limitations need to be addressed when implementing a high speed communication protocol, such as the GPON protocol, in a programmable logic device. Some of the common challenges when implementing high speed communication protocols include, among others, long dead time, multiple phase shifts, and short recovery time. These problems arise partly because a clock data recovery circuit is generally used to recover a clock signal from an incoming data stream and the clock data recovery circuit in the programmable device may not be able to lock to the incoming clock signal within a relatively short period of time.

Incoming data may be lost if the clock data recovery circuit is not able to lock to the incoming clock signal within a single data frame. Moreover, different components or devices coupled to the programmable device may send data to the programmable device at different phases even though they may all operate at the same frequency. Therefore, information may be lost as incoming data may not be accurately sampled by the device.

SUMMARY

In order to fully support a high speed communication protocol, such as the GPON protocol, a programmable device may need to be able to lock to the clock signal of an incoming data stream in a relatively short period of time. Embodiments of the present invention include techniques to calibrate a clock signal in an integrated circuit in response to an incoming data stream.

It is appreciated that the present invention can be implemented in numerous ways, such as a process, an apparatus, a system, a device, or a method on a computer readable medium. Several inventive embodiments of the present invention are described below.

In one embodiment, a method is disclosed. The method includes receiving a data packet with a first operating frequency rate using first and second receiver circuits. The data packet includes a plurality of preamble bits. The first and second receiver circuits may operate at second and third operating frequency rates, respectively. A portion of the data packet received at the first receiver circuit is transmitted to a control circuit. The plurality of preamble bits within the portion of the data packet is identified with the control circuit. A clock circuit is calibrated based on the identified preamble bits. The first and second receiver circuits may be clocked with first and second clock outputs from the clock circuit.

In another embodiment, another method is disclosed. The method includes receiving a data stream from an external component and checking the data stream with an error checking circuit for a plurality of valid preamble bits. At least one edge of a data window associated with a first bit of the plurality of valid preamble bits is identified. An edge of a first clock output of a clock circuit is adjusted to a center of the data window associated with the first bit of the plurality of preamble bits. An edge of a second clock output of the clock circuit is adjusted to a center of a data window associated with a second bit of the plurality of preamble bits.

In yet another embodiment, an integrated circuit is disclosed. The integrated circuit includes a first receiver circuit operable to receive a data stream with a plurality of preamble bits at a first operating frequency rate. The integrated circuit also includes a clock circuit with first and second clock outputs. The first clock output of a clock circuit is coupled to the first receiver circuit. An output of a calibration circuit is coupled to an input terminal of the clock circuit. The calibration circuit is coupled to receive the data stream from the first receiver circuit. The calibration circuit may be operable to tune the first and second clock outputs from the clock circuit based on the plurality of preamble bits.

Further features of the invention, its nature and various advantages will be more apparent from the accompanying drawings and the following detailed description of the preferred embodiments.

DETAILED DESCRIPTION

The embodiments provided herein include circuitry and techniques to calibrate a clock signal in an integrated circuit.

It will be obvious, however, to one skilled in the art, that the present exemplary embodiments may be practiced without some or all of these specific details. In other instances, well-known operations have not been described in detail in order not to unnecessarily obscure the present embodiments.

Generally, an integrated circuit device may be connected to other external circuitry such as other integrated circuit devices, memory modules, etc. and signals may travel from the integrated circuit to the external circuitry coupled to it and vice versa. For instance, an integrated circuit device may be placed on a printed circuit board with other components coupled to the integrated circuit through conductive pathways.

High speed signals with different phases may travel between the integrated circuit device and other components. In order to receive incoming data from different components, the integrated circuit device may need to be properly calibrated. It is therefore desirable to have a technique to properly calibrate the integrated circuit device and align clock signals in the integrated circuit device to incoming data streams when receiving high speed data streams from multiple external components, each operating at a different clock phase or frequency.

One of the embodiments describes a method to implement a high speed input-output protocol such as a Gigabit Passive Optical Network (GPON) protocol with multiple input-output circuits on an integrated circuit device. It should be appreciated that even though a GPON protocol is used herein as an exemplary embodiment, the techniques described herein may be applicable to other input-output protocols.

Instead of using a clock data recovery circuit, which may not be able to appropriately recover a clock signal from an incoming data stream within a specific amount of time, a calibrated phase-locked loop circuit is used to clock the incoming data stream, according to one embodiment. A calibration control circuit may be used to align the phases of clock outputs from the phase-locked loop circuit to the incoming data stream.

Figure 1:
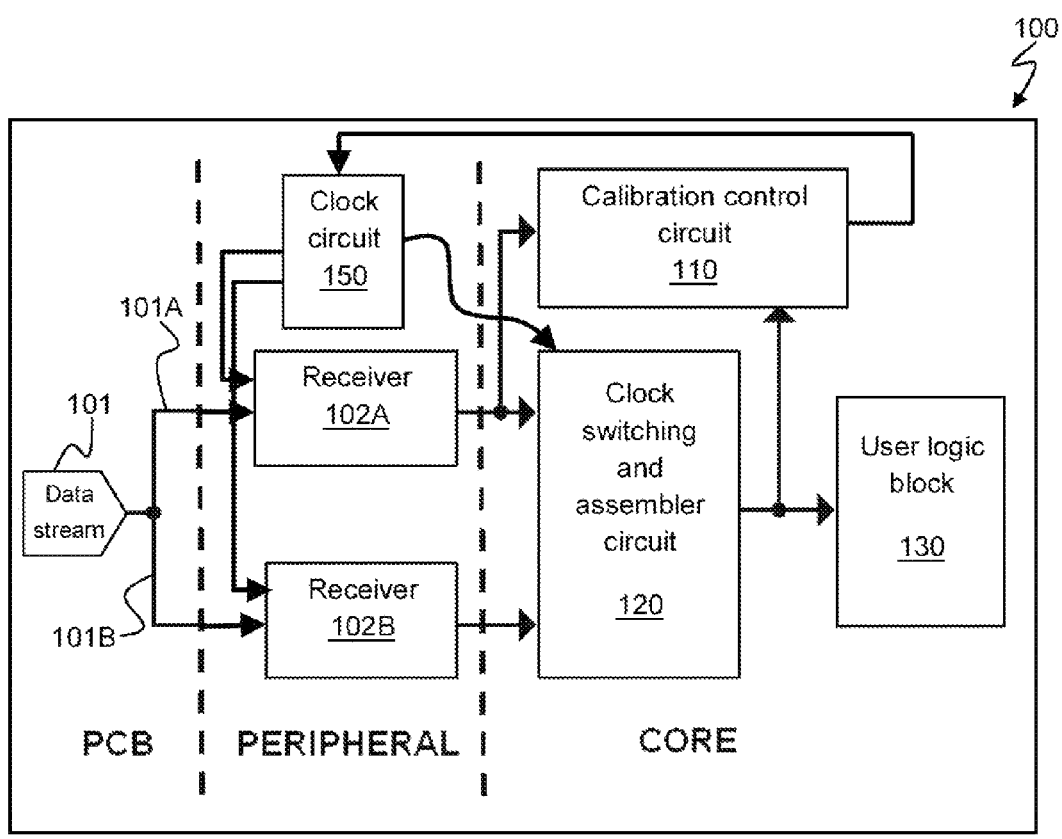
FIG. 1 is a simplified block diagram of an illustrative integrated circuit receiving a data stream from an external component in accordance with an embodiment of the present invention.

FIG. 1, meant to be illustrative and not limiting, shows block diagram of integrated circuit 100 receiving data stream 101 from an external component in accordance with one embodiment of the present invention. It should be appreciated that the integrated circuit may be placed on a printed circuit board and may be coupled to other components on the printed circuit board.

In the embodiment of FIG. 1, data stream 101 from an external component may be split into two separate channels, 101A and 101B. In an exemplary embodiment, the two separate channels, 101A and 101B, may be two separate traces coupled together. The two channels 101A and 101B may be coupled to two receiver circuits 102A and 102B, respectively, in the peripheral region of integrated circuit 100.

In one embodiment, each of receiver circuits 102A and 102B may be a differential receiver circuit such as a low voltage differential signal (LVDS) circuit. It should be appreciated that the frequency rate of data streams from the external component may be different than the operating frequency rates of receiver circuits 102A and 102B. For instance, the data stream from the printed circuit board may be a high-speed data stream, such as a Gigabit Passive Optical Network (GPON) data stream, operating at 2.5 gigabit per second (Gbps) while each of receiver circuits 102A and 120B may be a differential input circuit operating at 1.25 gigahertz (GHz). It should be appreciated that even though only two receiver circuits 102A and 102B are shown in the embodiment of FIG. 1, data streams from the printed circuit board may be split into any number of channels and more receiver circuits may be used in this context.

Receiver circuit 102A may transmit the received data stream to calibration control circuit 110 while both receiver circuits, 102A and 102B, may transmit the received data stream to clock switching and assembler circuit 120. It should be appreciated that receiver circuits 102A and 102B may include input buffers on the peripheral region of the integrated circuit that may be used to receive signals from external components coupled to the integrated circuit and transmit the signals to circuit blocks in the core region of the integrated circuit (e.g., calibration circuit 110, and clock switching and assembler circuit 120). A more detailed description of the calibration circuit 110 and the clock switching and assembler circuit 120 will be described later with reference to circuit 200 of FIG. 2, in the core region of the integrated circuit. In one embodiment, calibration control circuit 110 may calibrate clock circuit 150 on the integrated circuit to match a clock phase of the data stream received by receiver circuits 102A and 102B. In an exemplary embodiment, clock circuit 150 may be a phase-locked loop (PLL) circuit operable to provide clock signals at different phases to receiver circuits 102A and 102B.

Accordingly, clock circuit 150 may also provide clock switching and assembler circuit 120 with a clock signal that matches the phase of the data streams from receiver circuits 102A and 102B. Clock switching and assembler circuit 120 may then merge the two data streams from 102A and 102B as a single data stream before transmitting it to user logic block 130. It should be appreciated that user logic block 130 may represent circuitry in the integrated circuit that may be used to implement desired user functions.

Figure 2:
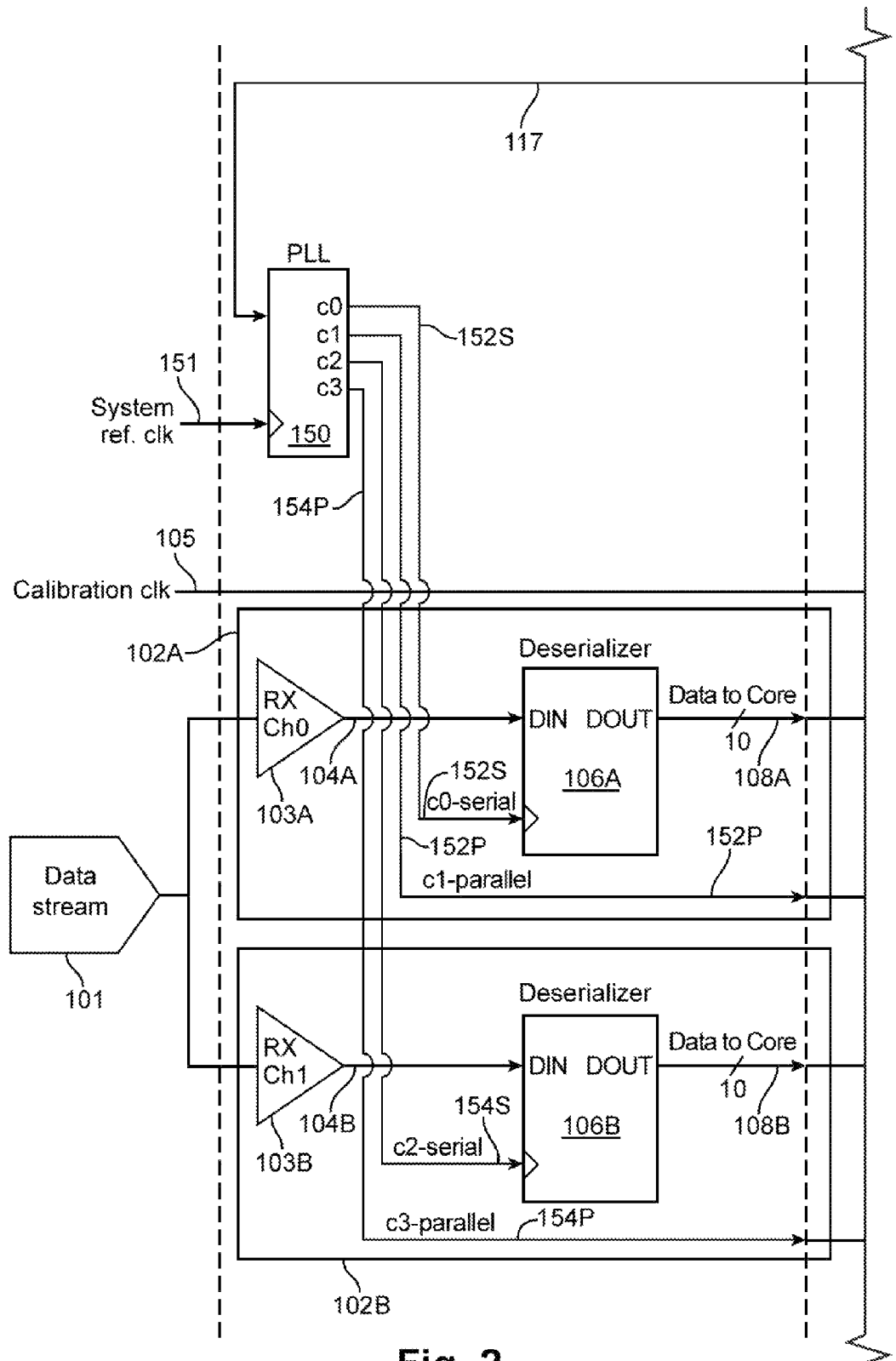
FIG. 2 is a schematic diagram of an illustrative integrated circuit with receiver circuits, a calibration control circuit, and a clock switching and assembler circuit in accordance with an embodiment of the present invention.
Figure 2:
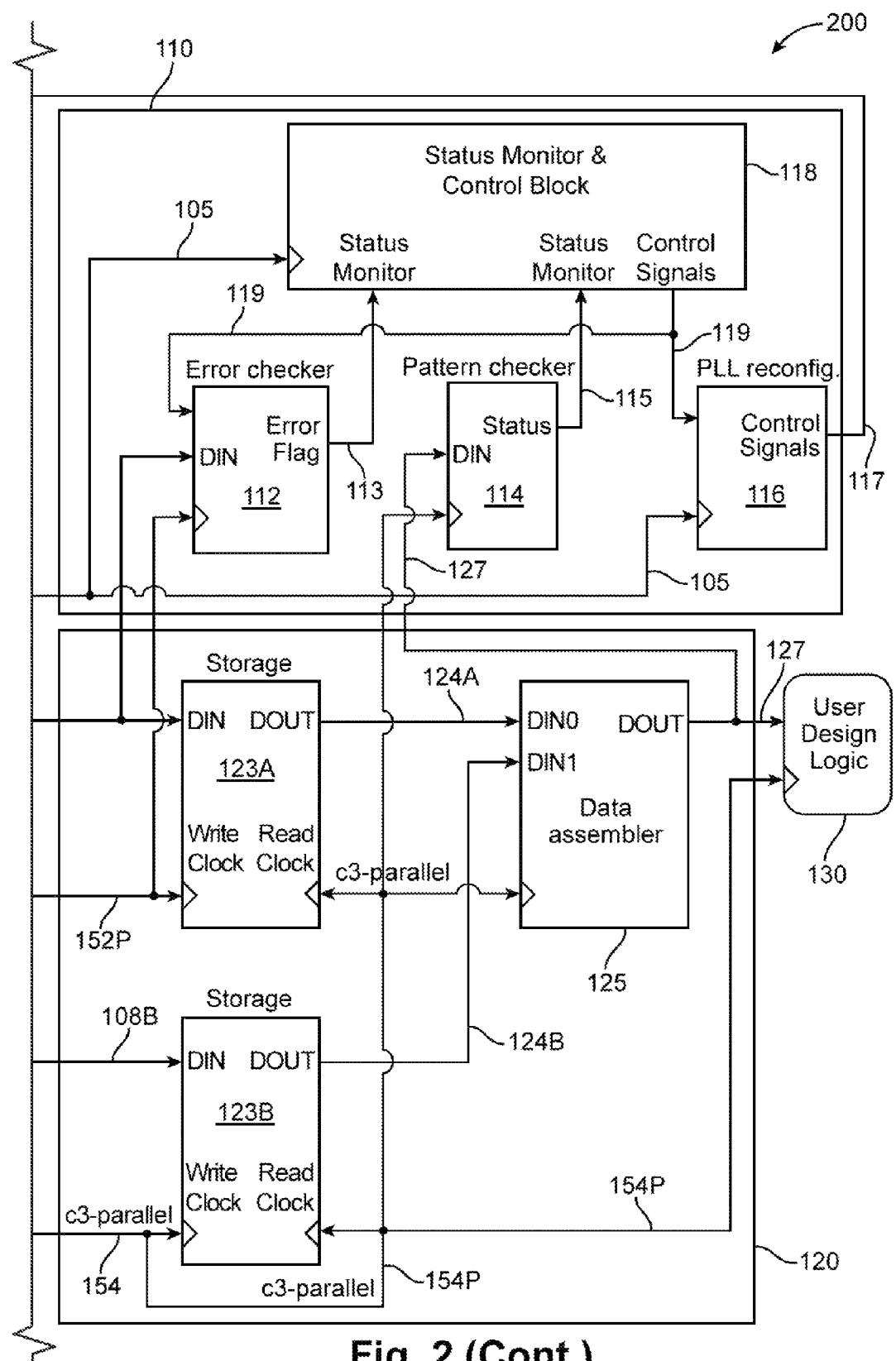

FIG. 2, meant to be illustrative and not limiting, shows circuit 200 with a more detailed representation of receiver circuits 102A and 102B, calibration control circuit 110, and clock switching and assembler circuit 120 in accordance with one embodiment of the present invention. Each of receiver circuits 102A and 102B may include a buffer circuit coupled to a deserializer circuit. For instance, in the embodiment of FIG. 2, buffer circuits 103A and 103B are coupled to deserializer circuits 106A and 106B, respectively. Signals received by deserializer circuits 106A and 106B may be clocked by phase-locked loop (PLL) circuit 150.

Outputs from receiver circuits 102A and 102B are clock switching and assembler circuit 120. Output from receiver circuit 102A may be further coupled to calibration control circuit 110. In one embodiment, calibration control circuit 110 may include error checker block 112, pattern checker block 114, and PLL reconfiguration block 116 coupled to status monitor and control block 118. Clock switching and assembler circuit 120 may include assembler circuit 125 and may include storage circuits 123A and 123B, which may be coupled to receive outputs from receiver circuits 102A and 102B respectively.

In the embodiment of FIG. 2, receiver circuits 102A and 102b, and PLL circuit 150 may be "hard" circuit elements on a periphery region of an integrated circuit device while calibration control circuit 110 and clock switching and assembler circuit 120 may be "soft" logic blocks on a core region of the integrated circuit device. It should be appreciated that "hard" circuit elements may be actual circuit elements on the integrated circuit device that may be used to perform specific functions while "soft" logic blocks may be formed by clusters of logic elements (e.g., look-up tables, etc.) to implement any of a variety of functions.

In one embodiment, as the integrated circuit device is powered up, status monitor and control block 118 may be used to activate a calibration process within the integrated circuit device. In an exemplary embodiment, status monitor and control block 118 may include a state machine configured to initiate and control a calibration operation within the integrated circuit device. In the embodiment of FIG. 2, status monitor and control block 118 and PLL reconfiguration block 116 may be clocked by calibration clock signal 105. It should be appreciated that calibration clock signal 105 may be slower than or similar to system reference clock signal 151. In one embodiment, the clock rate of calibration clock signal 105 depends on the speed of status monitor and control block 118 and PLL reconfiguration block 116.

Data stream 101, received at receiver circuits 102A and 102B, may be transmitted to error checker circuit 112. In one embodiment, data stream 101 may include a preamble signal or a training pattern transmitted from an external component to the integrated circuit. In the embodiment of FIG. 2, data stream 101 may be received by buffers 103A and 103B and transmitted, respectively, to deserializer circuits 106A and 106B. Data stream 101 may be a serial data stream and deserializer circuits 106A and 106B may be operable to convert data stream 101 to parallel data streams 108A and 108B, respectively.

A clock terminal of each of deserializer circuits 106A and 106B may be coupled to receive clock signals 152S and 154S, respectively, from PLL circuit 150. PLL circuit 150, in turn, may be coupled to system reference clock signal 151. In an exemplary embodiment, data stream 101 may have a data transfer rate of 2.5 Gbps and PLL circuit 150 may operate at a clock rate of 1.25 GHz. Accordingly, for every clock cycle, i.e., from one rising edge to a next rising edge or from one falling edge to a next falling edge, each of receiver circuits 102A and 102B may receive two data bits from data stream 101.

However, as deserializer circuits 106A and 106B may only capture one bit of data either at every rising edge or falling edge, one of the two data bits received from data stream 101 may be lost, by each deserializer circuit, at every clock cycle. As such, in an exemplary embodiment, clock signal 154S, coupled to deserializer circuit 106B, may be phase shifted by 180 degrees relative to clock signal 152S that is coupled to deserializer circuit 106A, such that deserializer circuit 106A captures the data bit lost in each clock cycle by deserializer circuit 106B and that deserializer circuit 106B captures the data bit lost in each clock cycle by deserializer circuit 106A (e.g., so that no data bits in incoming data stream 101 are lost).

Accordingly, deserializer circuit 106A may be used to capture the first of the two data bits received at every clock cycle and deserializer circuit 106B may be used to capture the remaining data bit. As such, even though each of receiver circuits 102A and 102B may operate at a lower speed compared to the data transfer rate of data stream 101, data stream 101 may still be fully captured by using two receiver circuits, 102A and 102B, operating in parallel and phase shifted from each other. It should be appreciated that even though two receiver circuits 102A and 102B are shown in the embodiment of FIG. 2, depending on the data transfer rate of data stream 101 and the speed of system reference clock signal 151, fewer or more receiver circuits that are appropriately phase shifted from each other may be used.

In one embodiment, once a calibration operation has been initiated, error checker circuit 112 may begin checking parallel data stream 108A received from deserializer circuit 106A for valid data (e.g., for valid preamble bits). In the embodiment of FIG. 2, error checker circuit 112, which may sometimes be referred to herein as a bit error rate tester, may be coupled to receive parallel clock signal 152P from PLL circuit 150. It should be appreciated that parallel clock signals 152P and 154P may be substantially slower than their respective serial clock signals, 152S and 154S. For instance, serial clock signal 152S may be at 1.25 GHz and parallel clock signal 152P may be at 125 MHz.

If error checker circuit 112 does not detect valid data in the sampled parallel data stream 108A (e.g., if circuit 112 detects random noise, which indicates either than no data is being received or that the phases of the clocks output by PLL circuit 150 are not aligned with the phase of incoming data signals), error checker circuit 112 may output error flag signal 113 and, in response, control circuitry 118 may provide control signals 119 to PLL reconfiguration block 116 that directs PLL reconfiguration block 116 to reconfigure PLL circuit 150 to adjust the phases of its clock outputs to another phase (e.g., to the next phase). These processes (e.g., which cycle the phases of PLL circuit 150 through the available phases) may continue until error checker circuit 112 detects valid data (e.g., until the phases of the clocks output by PLL circuit 150 may the phase of incoming data and the incoming data is valid data, rather than random noise).

Status monitor and control block 118 may receive error flag signal 113 through a status input terminal that is coupled to an output terminal of error checker circuit 112. Status monitor and control block 118 may then transmit appropriate control signals, control signals 119, to PLL reconfiguration block 116. PLL reconfiguration block 116 may accordingly transmit PLL reconfiguration control signals 117 to configure PLL circuit 150. It should be appreciated that PLL reconfiguration block 116 may be an interface that receives control signals 119 from status monitor and control block 118 and transmits appropriate PLL reconfiguration control signals 117 to PLL circuit 150. Once error checker circuit 112 detects valid data, error checker circuit 112 may provide a flag signal 113 to control block 118 indicating that valid data is being received.

In one embodiment, status monitor and control block 118 may be a user-design dependent block while PLL reconfiguration block 117 may be a generic or design independent interface block that may be operable to transmit PLL reconfiguration signals 117 to PLL circuit 150 based on control signals 119. In another embodiment, status monitor and control block 118 may be configured with a PLL reconfiguration interface block. In such an embodiment, a separate or generic PLL reconfiguration block (e.g., PLL reconfiguration block 117) may not be required as control signals 119 may be transferred directly to PLL circuit 150 through the PLL reconfiguration interface block within status monitor and control block 118.

In an exemplary embodiment, PLL circuit 150 may be operable to generate clock signals with multiple phases. For instance, PLL circuit 150 may be operable to generate clock signals with eight different phases and PLL reconfiguration block 116 may be operable to control PLL circuit 150 such that error checker block 112 may sample parallel data stream 108A using every clock phase generated by PLL circuit 150.

PLL reconfiguration block 116 may further be operable to track all of the clock phases in which valid data streams are detected by error checker block 112. Once a valid data stream is detected by error checker block 112 and an appropriate clock phase is selected by PLL reconfiguration block 116, PLL circuit 150 may output clocks signals 152S, 152P, 154S, and 154P at the appropriate phases.

In one embodiment, data stream 101 may be a data packet from an external component that includes a plurality of preamble bits, actual data bits, and an end-of-file marker. In one embodiment, PLL reconfiguration block 116 selects a clock phase that corresponds relatively closely with a phase of the plurality of preamble bits. For instance, the rising (or falling) edges of clock signal 152S may correspond to the center of the data windows of a first portion of the plurality of preamble bits, and the rising edges of clock signal 154S may correspond to the center of the data windows of a second portion of the plurality of preamble bits. It should be appreciated that the preamble bits may be a training pattern that may include a plurality of predetermined data bits for calibrating a clock circuit such as PLL circuit 150 according to a phase of an incoming data stream.

Once PLL circuit 150 has been calibrated, receiver circuits 102A and 102B may begin to receive actual data bits from data stream 101. As mentioned above, deserializer circuits 106A and 106B may be clocked respectively by clock signals 152S and 154S that are phase shifted by 180 degrees from each other. As such, deserializer circuit 106A may sample and convert a first portion of serial data stream 101 to first parallel data stream 108A and deserializer circuit 106B may sample and convert a second portion of serial data stream 101 to second parallel data stream 108B. In one embodiment, deserializer circuit 106A may sample and convert all the odd bits in serial data stream 101 while deserializer circuit 106B may sample and convert all the even bits in serial data stream 101.

First parallel data stream 108A may be transmitted to storage circuit 123A and second parallel data stream 108B may be transmitted to storage circuit 123B. Storage circuits 123A and 123B are clocked by parallel clock signals 152P and 154P, respectively. In the embodiment of FIG. 2, each of storage circuits 123A and 123B may be controlled by two different clock signals, namely a "write clock" signal and a "read clock" signal. Accordingly, data may be written to and stored in storage circuits 123A and 123B according to their "write clock" signals, and the stored data may be read from storage circuits 123A and 123B according to their "read clock" signals.

In one embodiment, parallel clocks signals 152P and 154P, coupled respectively to the "write clock" input terminals of storage circuits 123A and 123B, are phase shifted from each other by 180 degrees. It should be appreciated that parallel clock signal 152P is a corresponding parallel clock signal for serial clock signal 152S and parallel clock signal 154P is a corresponding parallel clocks signal for serial clock signal 154S.

First parallel data stream 108A, may be stored in storage circuit 123A and second parallel data stream 108B may be stored in storage circuit 123B before being transmitted to data assembler circuit 125. Data assembler circuit 125 may be coupled to receive first and second parallel data streams, 124A and 124B, from storage circuits 123A and 123B, respectively. In the embodiment of FIG. 2, the clock input terminal of assembler circuit 125 and the "read clock" input terminals of storage circuits 123A and 123B are coupled to receive parallel clock signal 154P.

It should be appreciated that first and second parallel data streams 108A and 108B—due to the fact that even bits in a data stream generally come after the odd bits—may not be received simultaneously by storage circuits 123A and 123B. As such, the later clock signal, in this embodiment, parallel clock signal 154P, may be used as the "read clock" signal for both storage circuits 123A and 123B as well as data assembler circuit 125 to ensure that storage circuits 123A and 123B contain valid data bits before a read attempt is initiated.

First parallel data stream 124A and second parallel data stream 124B from storage circuits 123A and 123B, respectively, may be merged by assembler circuit 125. In an exemplary embodiment, first and second parallel data streams 124A and 124B are merged by assembler circuit 125 to produce a single parallel data stream 127 having sequentially ordered data bits. The combined parallel data stream 127 may then be transmitted to user design logic block 130. User design logic block 130 may be clocked with parallel clock signal 154P.

In one embodiment, combined parallel data stream 127 may only be transmitted to user design logic block 130 after the calibration operation has been performed. In another embodiment, a ready signal may be transmitted to user design logic block 130 after the calibration operation has been performed to enable the transmission of combined parallel data stream 127 to user design logic block 130. It should be appreciated that user logic block 130 may include circuitry or logic elements, details of which are not shown in order not to unnecessarily obscure the present invention, that may be used to implement desired user functions.

The combined parallel data stream 127 may also be transmitted to pattern checker block 114. As pattern checker block 114 is coupled to receive the combined parallel data stream 127 from data assembler circuit 125, pattern checker block 114 may also be clocked with parallel clock signal 154P. As mentioned above, data stream 101 may include an end-of-file marker to indicate the end of the data stream and pattern checker block 114 may be operable to check parallel data stream 127 for the end-of-file marker, according to one embodiment. Accordingly, pattern checker block 114 may output a signal, status signal 115, to indicate if an end-of-file marker has been detected.

Once status monitor and control block 118 receives status signal 115 from pattern checker block 114 indicating that an end-of-file marker has been detected, status monitor and control block 118 may initiate a new calibration operation that is similar to the calibration process described above. In an exemplary embodiment, the calibration operation may be repeated for every new data stream received by the integrated circuit.

Figure 3:
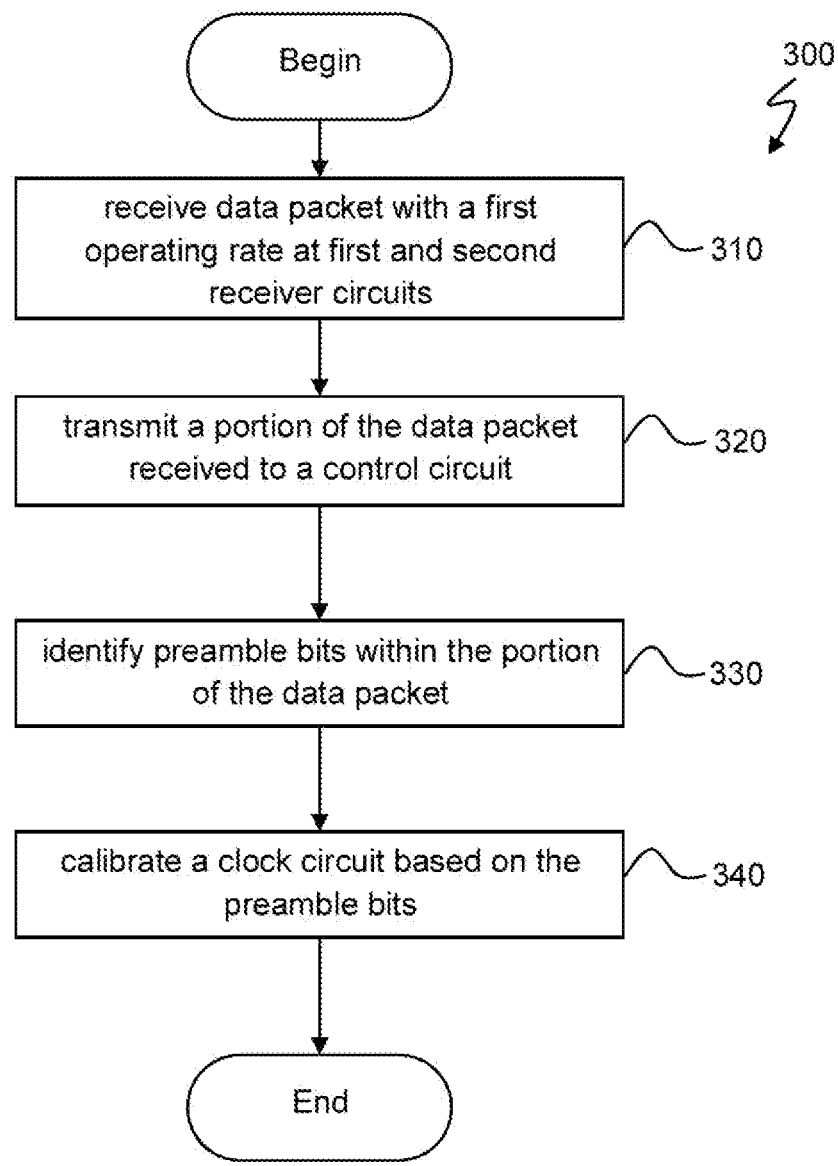
FIG. 3 is a simplified method flow chart of illustrative steps involved in operating an integrated circuit in accordance with an embodiment of the present invention.

FIG. 3, meant to be illustrative and not limiting, shows simplified method 300 for operating an integrated circuit in accordance with an embodiment of the present invention. At step 310, first and second receivers receive a data packet having a first operating frequency rate. In one embodiment, the data packet may include a plurality of preamble bits, a data stream and an end-of-frame marker. The first and second receiver circuits may operate at a different operating frequency rate than the first operating frequency rate of the received data packet.

In one embodiment, the first and second receiver circuits may have a slower operating rate compared to the operating rate of the data packet. As an example, the data packet may be a data stream with a data transfer rate of 2.5 Gbps while the first and second receiver circuits may operate at 1.25 GHz.

At step 320, a portion of the data packet received is transmitted to a control circuit. In the embodiment of FIG. 1, data stream 101 received at receiver circuit 102A may be transferred to calibration control circuit 110. At step 330, a plurality of preamble bits within the portion of the data packet is identified with the calibration control circuit.

A clock circuit is calibrated based on the plurality of preamble bits at step 340. In one embodiment, the clock circuit may be a PLL circuit and the calibration control circuit may configure the PLL circuit to output clock signals at specific phases according to the plurality of preamble bits in the data packet received.

Figure 4:
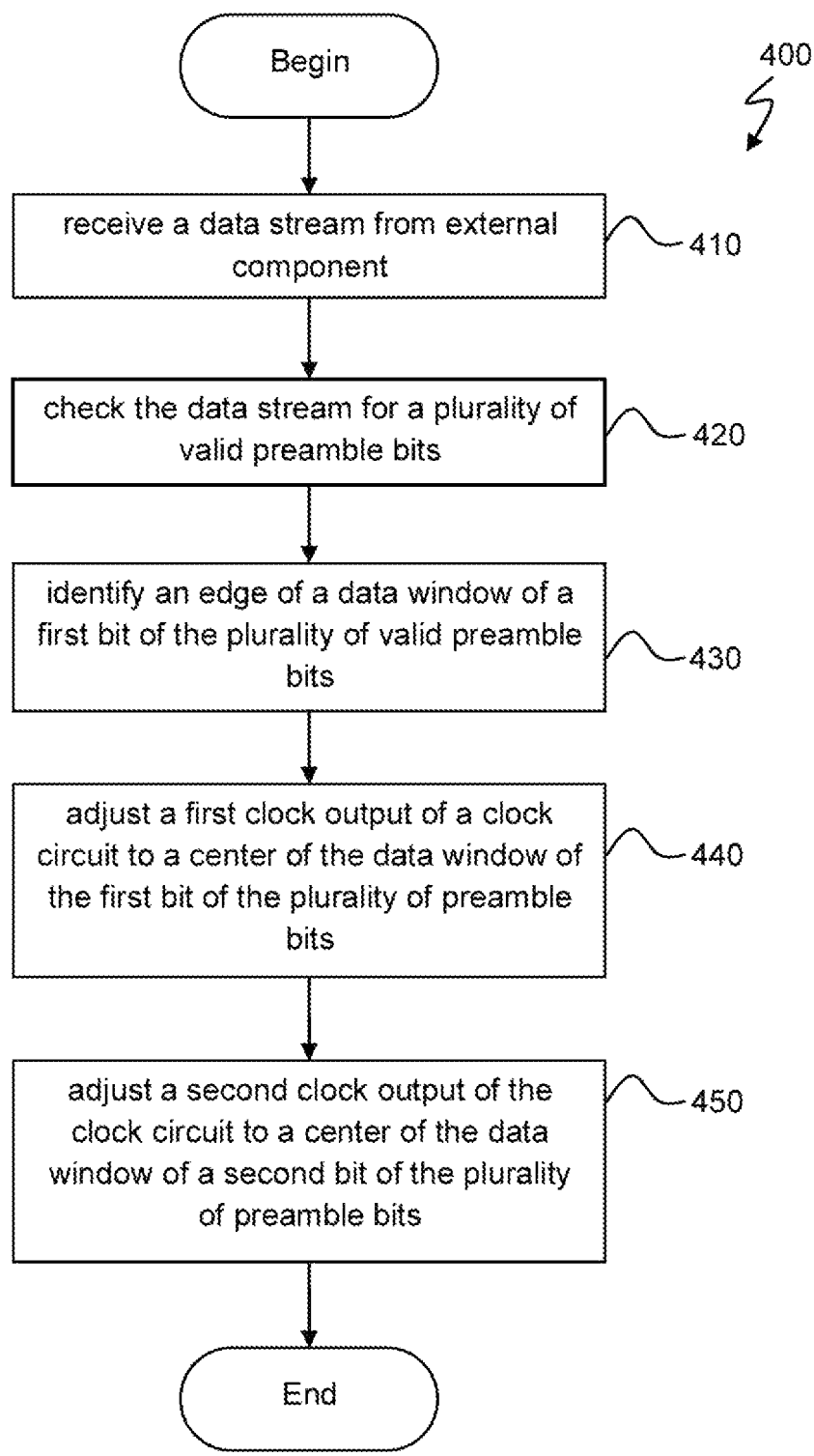
FIG. 4 is a simplified method flow chart of illustrative steps involved in calibrating a clock circuit in accordance with an embodiment of the present invention.

FIG. 4, meant to be illustrative and not limiting, shows simplified method flow 400 for calibrating a clock circuit in accordance with an embodiment of the present invention. At step 410, a data stream from an external component is received. In an exemplary embodiment, the clock circuit may be a clock circuit in an integrated circuit device and the external component may be another circuit or device that is coupled to the integrated circuit device through an input-output interface.

At step 420, the data stream is checked for a plurality of valid preamble bits. In one embodiment, the data stream may be transmitted to a checker circuit, such as error checker circuit 112 of FIG. 2, that may be operable to sample a plurality of preamble bits multiple times to determine a validity of the preamble bits in the received data stream.

An edge of a data window of a first bit of the plurality of valid preamble bits is identified at step 430. A first clock output of a clock circuit is adjusted to a center of the data window of the first bit of the plurality of preamble bits at step 440. Accordingly, at step 450, a second clock output of the clock circuit is adjusted to a center of the data window of a second bit of the plurality of preamble bits.

In one embodiment, the plurality of preamble bits may be clocked with a PLL circuit that is operable to output clock signals at a common frequency but with different phases. Therefore, the plurality of preamble bits may be sampled numerous times using multiple clock signals with different phases to identify an operating phase of the plurality of preamble bits.

In one embodiment, the clock signal from the PLL circuit with a rising edge (or a falling edge) that corresponds relatively closely to the center of the data window of the first bit of the plurality of preamble bits is selected as the first clock output of the PLL circuit. The PLL circuit may be operable to output two clock signals with different phases at any one time. In an exemplary embodiment, the first and second clock outputs may be clock signals with a 180 degree phase difference. Accordingly, a rising edge (or a falling edge) of the second clock output of the PLL circuit may be adjusted to the center of the data window of the second bit of the plurality of preamble bits.

Figure 5:
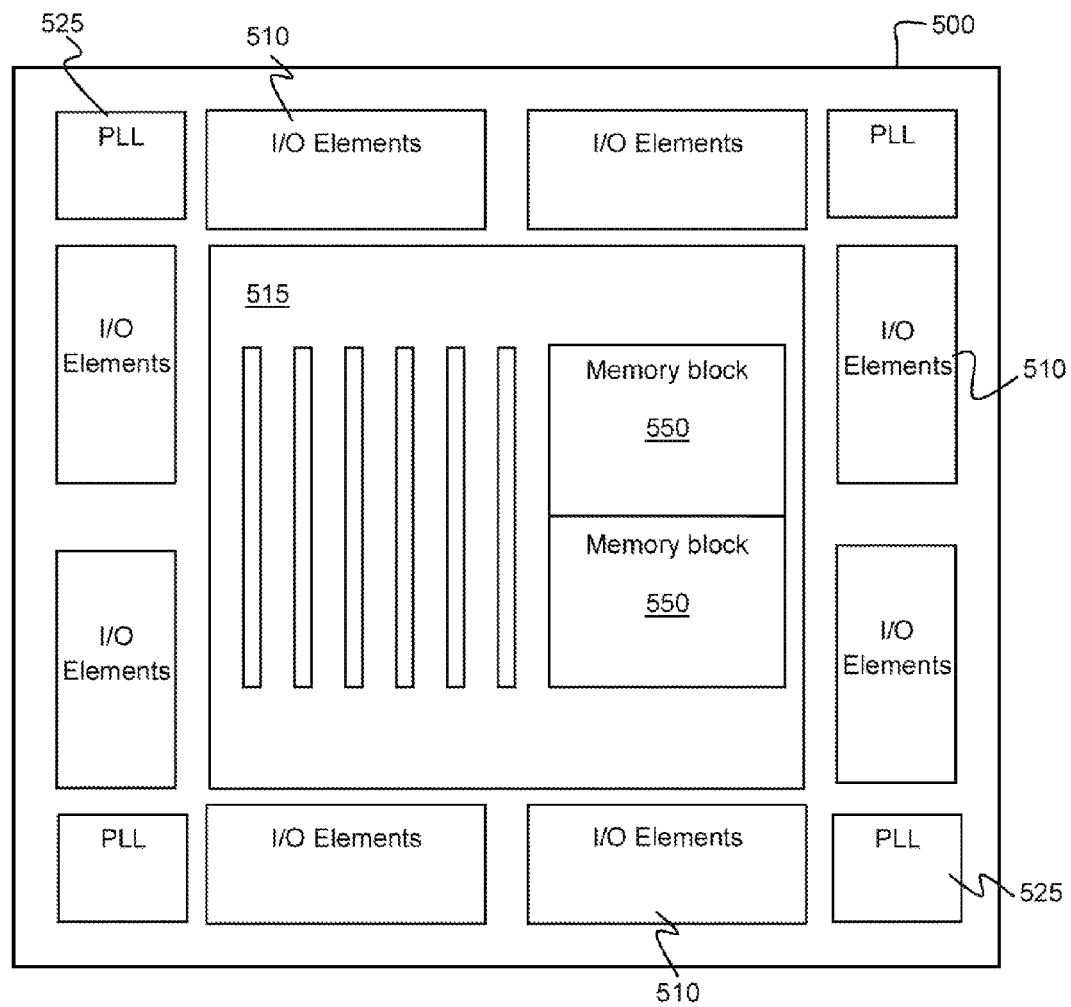
FIG. 5 is a simplified block diagram of an illustrative integrated circuit in accordance with an embodiment of the present invention.

FIG. 5, meant to be illustrative and not limiting, shows a simplified block diagram of integrated circuit 500 in accordance with an embodiment of the present invention. Integrated circuit 500 includes core logic region 515 and input-output elements 510. Other auxiliary circuits such as phase-locked loops (PLLs) 525 for clock generation and timing, can be located outside the core logic region 515 (e.g., at corners of integrated circuit 500 and adjacent to input-output elements 510).

Core logic region 515 may be populated with logic cells that may include "logic elements" (LEs), among other circuits. LEs may include look-up table-based logic regions and may be grouped into "Logic Array Blocks" (LABs). The LEs and groups of LEs or LABs can be configured to perform user functions. Configuration data loaded into configuration memory can be used to produce control signals that configure the LEs and groups of LEs and LABs to perform the desired user functions. Core logic region 515 may also include a plurality of embedded memory blocks 550 that can be used to perform a variety of functions.

Input-output elements 510 may also include input-output buffers that connect integrated circuit 500 to other external components. Signals from core region 515 are transmitted through input-output elements 510 to external components that may be connected to integrated circuit 500. A single device like integrated circuit 500 can potentially support a variety of different interfaces and each individual input-output bank 510 can support a different input-output standard with a different interface.

Integrated circuit 500 receives signals from external circuitry at input-output elements 510. Signals may be routed from input-output elements 510 to core logic region 515 and other logic blocks on integrated circuit 500. For instance, integrated circuit 500 may be placed on a printed circuit board and may receive signals or data streams from other circuitry. In an exemplary embodiment, input-output elements 510 may include buffer circuits 103A and 103B of FIG. 2.

Core logic region 515 and other logic blocks on integrated circuit 500 may perform functions based on the signals received. In one embodiment, core logic region 515 may include calibration control circuit 110, clock switching and assembler circuit 120, and user logic block 130 of FIG. 1. Signals may be sent from core logic region 515 and other relevant logic blocks of integrated circuit 500 to other external circuitry or components that may be connected to integrated circuit 500 through input-output elements 510.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method comprising:
receiving a data packet with a first operating frequency rate using first and second receiver circuits, wherein the data packet comprises a plurality of preamble bits, wherein the first and second receiver circuits operate at a second operating frequency rate, respectively;
transmitting a first portion of the data packet received at the first receiver circuit to a control circuit, wherein transmitting the first portion of the data packet received at the first receiver circuit to the control circuit comprises transmitting the first portion of the data packet received at the first receiver circuit to the control circuit without transmitting a second portion of the data packet received at the second receiver to the control circuit;
identifying the plurality of preamble bits within the first portion of the data packet with the control circuit;
calibrating a clock circuit based on said identified preamble bits; and
clocking the first and second receiver circuits with first and second clock outputs, respectively, from the clock circuit.

2. The method defined in claim 1 further comprising:
identifying an end-of-frame marker with the control circuit prior to identifying the plurality of preamble bits.

3. The method defined in claim 2, wherein calibrating the clock circuit comprises:
determining at least one edge of a data window associated with a first preamble bit of the plurality of preamble bits;
adjusting the first clock output of the clock circuit, wherein said adjusting comprises aligning an edge of the first clock output to a center of a data window of the first preamble bit of the plurality of preamble bits; and
adjusting the second clock output of the clock circuit, wherein said adjusting comprises aligning an edge of the second clock output to a center of a data window of a second preamble bit of the plurality of preamble bits.

4. The method defined in claim 3 further comprising:
deserializing the data packet at each of the first and second receiver circuits with first and second deserializer circuits respectively, wherein the first deserializer circuit is clocked with the first clock output and wherein the second deserializer circuit is clock with the second clock output;
synchronizing the deserialized data packet from each of the first and second receiver circuits; and
merging the synchronized and deserialized data packet from the first receiver circuit with the synchronized and deserialized data packet from the second receiver circuit.

5. The method defined in claim 1, wherein the plurality of preamble bits comprises a training pattern.

6. The method defined in claim 1, wherein the second operating frequency rate is less than the first operating frequency rate.

7. The method defined in claim 1, wherein the second operating frequency rate is approximately half of the first operating frequency rate.

8. A method of calibrating a clock circuit, the method comprising:
receiving a data stream from first and second receiver circuits;
checking the data stream received only from the first receiver with an error checking circuit for a plurality of valid preamble bits;
identifying at least one edge of a data window associated with a first bit of the plurality of valid preamble bits;
adjusting edges of a first clock output of a clock circuit to a center of the data window associated with the first bit of the plurality of preamble bits without adjusting the frequency of the first clock output; and
adjusting edges of a second clock output of the clock circuit to a center of a data window associated with a second bit of the plurality of preamble bits without adjusting the frequency of the second clock output.

9. The method defined in claim 8, wherein the data stream has a first operating data frequency rate, and wherein the receiving the data stream comprises:

receiving the data stream at the first receiver circuit, wherein the first receiver circuit operates at a second operating data frequency rate; and
receiving the data stream at the second receiver circuit, wherein the second receiver circuit operates at the second operating data frequency rate.

10. The method defined in claim 9, wherein the second operating data frequency rate is slower than the first operating data frequency rate.

11. The method defined in claim 8, wherein the data stream comprises an end-of-frame marker, and wherein the method further comprises:
identifying the end-of-frame marker in the data stream prior to the checking the data stream for the plurality of valid preamble bits.

12. The method defined in claim 8, wherein the first clock output and the second clock output comprise first and second clock signals having a common frequency and having a 180° phase difference with respect to each other.

13. The method defined in claim 8 further comprising:
transmitting a ready signal to a user block after adjusting the first clock output and adjusting the second clock output;
receiving the data stream at the first receiver circuit, wherein the first receiver circuit operates at a first data frequency rate;
receiving the data stream at the second receiver circuit, wherein the second receiver circuit operates at the first data frequency rate; and
transmitting an output data stream, based on the data stream from the first receiver circuit and the data stream from the second receiver circuit, to the user block.

14. The method defined in claim 13 further comprising:
combining the data stream from the first receiver circuit and the data stream from the second receiver circuit using an assembler circuit to form said output data stream prior to the transmitting the output data stream to the user block.

15. An integrated circuit comprising:
a first receiver circuit operable to receive a data stream, wherein the first receiver operates at a first operating frequency rate, wherein the data stream comprises a plurality of preamble bits;
a clock circuit having a first clock output and a second clock output, wherein the first clock output is coupled to the first receiver circuit; and
a calibration circuit that receives the data stream from only the first receiver, having an output coupled to an input terminal of the clock circuit, wherein the calibration circuit is operable to tune the first and second clock outputs from the clock circuit based on the plurality of preamble bits.

16. The integrated circuit defined in claim 15 further comprising:
a second receiver circuit operable to receive the data stream, wherein said second receiver circuit operates at the first operating rate, wherein the second clock output is coupled to the second receiver circuit.

17. The integrated circuit defined in claim 16, wherein the integrated circuit is placed on a printed circuit board, and wherein the first receiver circuit is coupled to a first connection on the printed circuit board, and wherein the second receiver circuit is coupled to a second connection on the printed circuit board.

18. The integrated circuit defined in claim 15, wherein the calibration circuit comprises:

a first checker circuit having an input coupled to receive the data stream from the first receiver circuit and an output coupled to a first input terminal of a control block, wherein the first checker circuit is operable to detect the plurality of preamble bits in the data stream;

a second checker circuit having an output coupled to a second input terminal of the control block, wherein the second checker circuit is operable to detect an end-of-frame marker in the data stream; and a clock configuration circuit having an output terminal coupled to the output of the calibration circuit and an input terminal coupled to an output of the control block, wherein the control block is operable to transmit control signals to the clock configuration circuit to tune the clock circuit.

19. The integrated circuit defined in claim 15, wherein the first clock output and the second clock output comprise first and second clock signals having a common frequency and having a 180° phase difference with respect to each other.

20. The integrated circuit defined in claim 15, wherein the first receiver circuit is a differential input circuit and wherein the plurality of preamble bits comprises a repetitive binary pattern.

21. The integrated circuit defined in claim 15, wherein the first receiver circuit includes a deserializer circuit that receives a serial data stream and that outputs data in parallel.

* * * * *